May 20, 1952 D. D. BIRT 2,597,524
CULTIVATOR DISK MOUNTING
Filed July 14, 1947 3 Sheets-Sheet 3
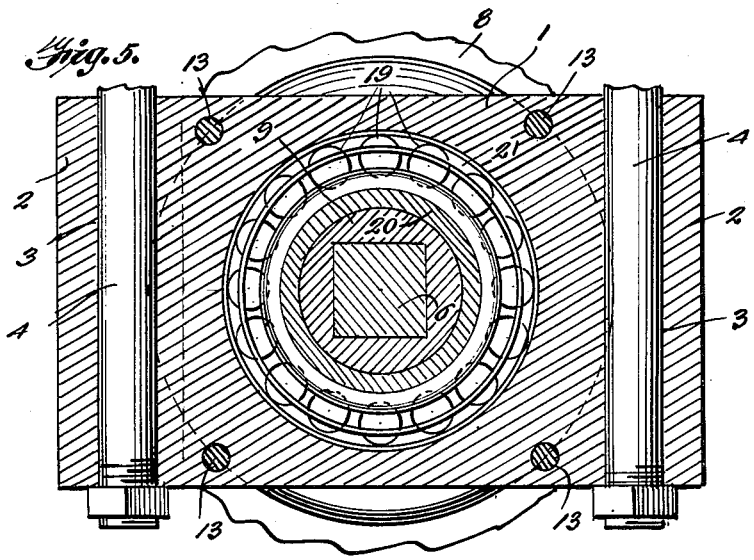
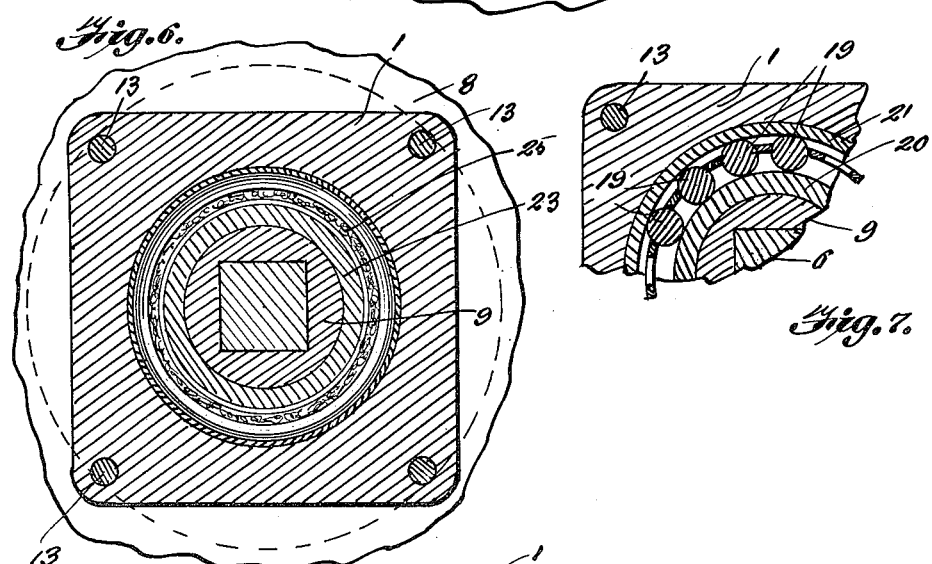
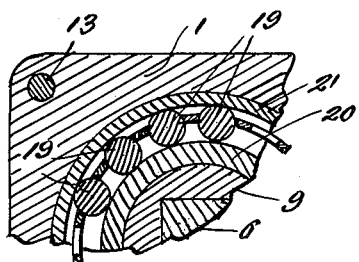
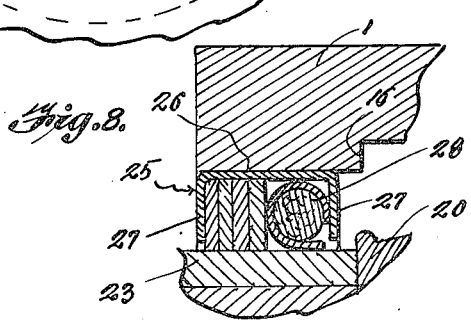
INVENTOR.
DANNIE D. BIRT Patented May 20, 1952

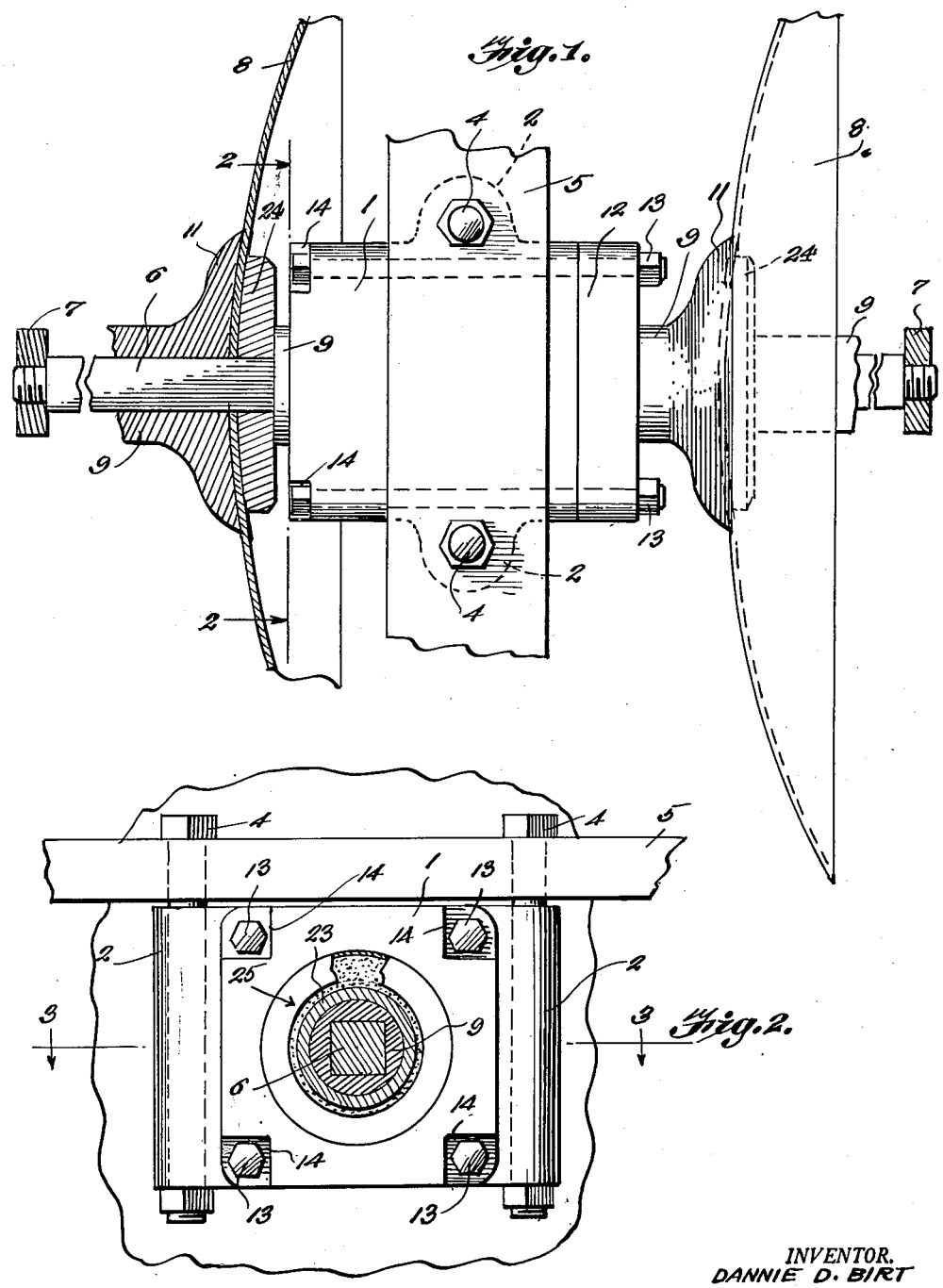

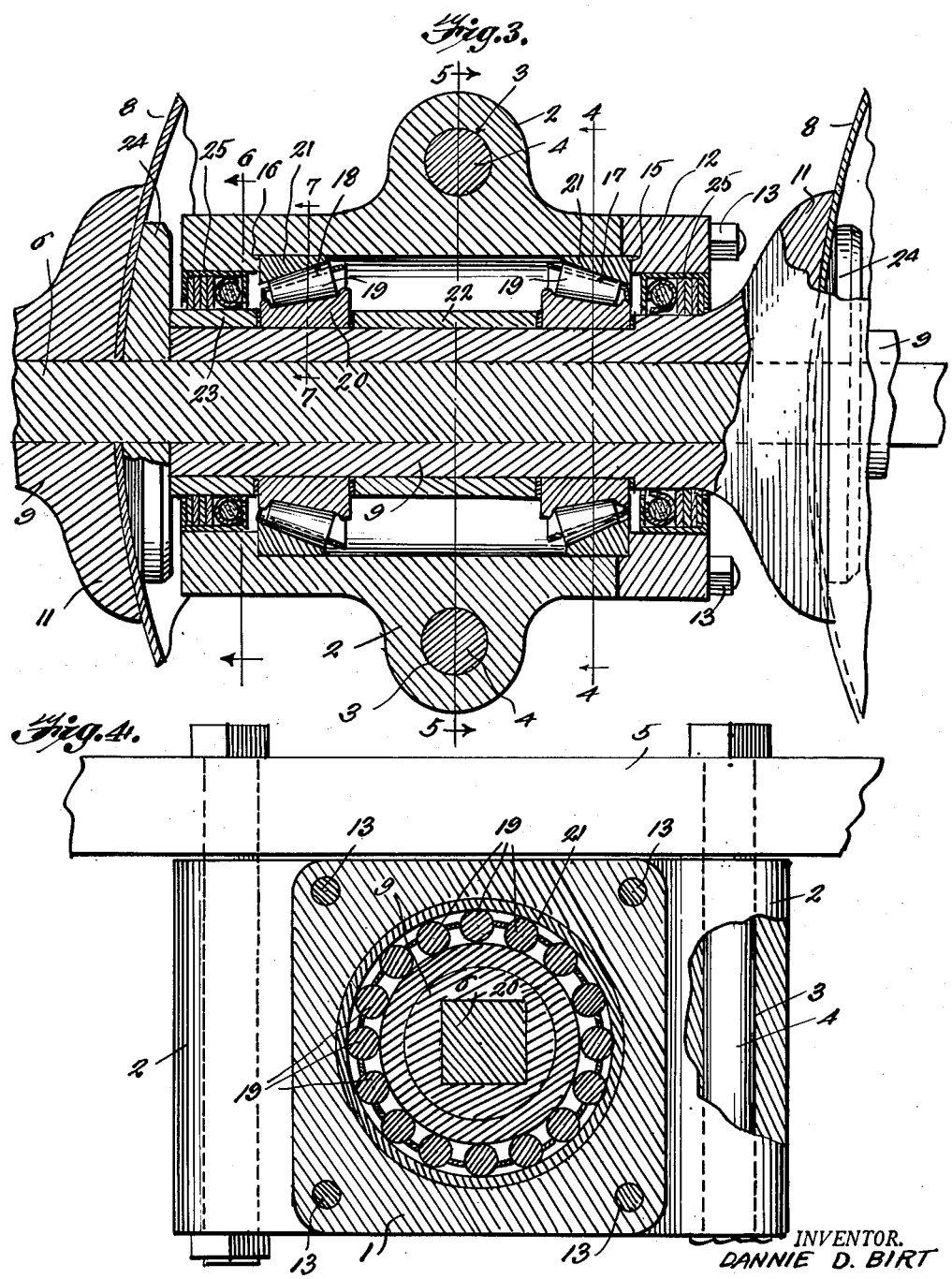

2,597,524

UNITED STATES PATENT OFFICE 2,597,524

CULTIVATOR DISK MOUNTING

Dannie D. Birt, Guymon, Okla., assignor to Dandee Manufacturing Company, Inc., a corporation of Oklahoma Application July 14, 1947, Serial No. 760,779

5 Claims. (Cl. 308—181)

1

This invention relates to a mounting for cultivator discs and it is one object of the invention to provide a mounting so formed that anti-friction bearings will be firmly held in a housing about a sleeve or spool carrying discs and prevented from having movement longitudinally of the spool and becoming quickly worn and allowing wobbling movement of the sleeve and the discs.

Another object of the invention is to provide the mounting with packings at ends of the housing for retaining a lubricant in the housing and also preventing dirt from entering the housing and causing wear upon the bearings.

Another object of the invention is to provide a mounting of such construction that it may be easily and quickly assembled and firmly held in the assembled condition, it being also easy to take the bearing apart when lubrication or replacement of parts is necessary.

Another object of the invention is to provide a mounting which is of simple construction, efficient in operation, and capable of being manufactured at low cost.

The invention is illustrated in the accompanying drawings wherein:

Fig. 1 is a top plan view of the improved mounting.

Fig. 2 is a transverse sectional view taken along the line 2—2 of Figure 1.

Fig. 3 is a sectional view taken longitudinally through the mounting along the line 3—3 of Figure 2.

Fig. 4 is a transverse sectional view taken through one end portion of the mounting along the line 4—4 of Figure 3.

Fig. 5 is a sectional view taken midway the length of the mounting along the line 5—5 of Figure 3.

Fig. 6 is a transverse sectional view taken along the line 6—6 of Figure 3.

Fig. 7 is a fragmentary sectional view taken along the line 7—7 of Figure 3.

Fig. 8 is a fragmentary sectional view taken through an end portion of the housing and one of the grease seals.

This improved mounting has a housing 1 formed of cast iron, or other material and open at its opposite ends. Vertical bosses 2 formed with bores 3 extend vertically midway the length of the housing in front of and at the rear of the housing, and through these bosses pass bolts 4 by means of which the housing is secured under the beam 5 of a cultivator or harrow. A shaft 6 which is square in cross section, as shown in

2

Figure 2, extends transversely of the harrow or cultivator and passes longitudinally through the housing 1 axially thereof and has its ends threaded to receive nuts 7.

Discs 8 of the type used for disc cultivators and harrows fit about the shaft 6 between opposite ends of the housing and ends of the shaft, and while two of the discs have been shown in the present illustration it will be understood that as many as desired may be used. Between the two discs shown extends a sleeve or spindle 9 which passes through the housing longitudinally thereof and turns with the shaft about which it fits. One end portion of this spindle 9 is enlarged to form a circumferentially extending shoulder 10 and about this end of the sleeve is a head 11 having a concaved face for bearing against the convexed face of the disc. The head is located externally of the housing and this end of the housing carries a terminal section 12 which is held to the housing by bolts 13. The bolts pass longitudinally through the housing and at the opposite end thereof from the section 12 have heads seated in recesses 14 formed in the housing. At its inner end the terminal section 12 is formed with a circumferentially extending recess defining a shoulder 15 and the other end portion of the housing is internally thickened to form a similar shoulder 16, the two annular shoulders 15 and 16 being of the same depth.

Anti-friction bearings 17 and 18 are mounted in end portions of the housing and each has a plurality of tapered rollers 19 rotatably mounted between inner and outer bearing rings or races 20 and 21. The bearings 17 fit snugly in the housing about end portions of the sleeve with their outer rings or races bearing against the shoulders 15 and 16 and the inner race of the bearing 17 in abutting engagement with the shoulder 10 of the sleeve. Between the two bearings is a spacer sleeve 22 which fits about the spindle 9 and the outer side face of the inner race of the bearing 18 is engaged by a second spacer sleeve having its outer end engaged by a block 24 having a convexed face in snug fitting engagement with the concaved face of the disc 8. When the nuts 7 are tightened they apply pressure longitudinally of the shaft 6 and the discs 8 will be firmly gripped between the heads 11 and the blocks 24 and pressure will also be applied to the sleeve 23 to shift the two sleeves longitudinally of the spool and cause the bearing 17 to be gripped between the sleeve 22 and the shoulder 10 and the bearing 18 to be gripped between the confronting ends of the sleeves 22 and 23. By this arrangement the anti-friction bearings will be prevented from having movement longitudinally of the spool and their outer rings or races will be held in contact with the shoulders 15 and 16. This will prevent the spindle 9 and the discs 8 from having movement transversely of the discs but the shaft 6 and the spindle 9 and discs 8 carried thereby will be permitted to turn freely during use of the cultivator.

The housing 1 is filled with grease or an equivalent and in order to hold this lubricant in the casing there have been provided packing rings or seals 25. These seals fit about the sleeve 23 and the enlarged end portion of the spindle 9 close to the head 11 thereof. The seals are of duplicate construction and each has a ring and annular casing 26 formed with the side walls 27 of such depth that their edges are spaced from the sleeve 23 or the portion of the spindle about which the seal fits. Packing 28 which may be formed of felt, or other suitable material, is fitted into the casing 26 and compressed by a spring so that the packing has close fitting engagement with the ring 23 or the spindle and very effectively confines the lubricant in the housing 1. Therefore leakage of lubricant from the housing will be prevented, the packings also serving to prevent dirt, sand, water and the like from entering the housing and causing members enclosed in the housing to be scored, rusted, or otherwise damaged.

In the present illustration there has been shown a cultivator having more than two discs 8 and it will be understood that each disc is mounted at the headed end of a spindle which is rotatably mounted through a housing 1 suspended from a cultivator bar or beam 5. It will be understood that if the cultivator has only two discs 8 and the head 11, at the left side of Figure 1, will consist of a block engaged by a nut 7 or by a sleeve against which the nut bears, the block 24 at the right side of this figure being engaged by a sleeve against which the second nut bears or directly engaged by the second nut.

Having thus described the invention, what is claimed is:

1. In a mounting for spaced ground working discs of an agricultural implement, a housing disposed between a pair of such discs and connected with a beam of said implement, said housing having opposite open end portions facing the pair of discs, a pair of widely spaced anti-friction bearings fitted in said open end portions of the housing close to the outer extremities thereof, a head opposite one open end portion of the housing exteriorly thereof and having a spindle journalled in and projecting through said bearings and the opposite open end portion of the housing, means for securing a disc to said head and a disc to the free end of the spindle, and separate means for holding the bearings against endwise movement relative to each other and the housing.

2. In a mounting for spaced ground working discs of an agricultural implement, a housing disposed between a pair of such discs and connected with a beam of said implement, said housing providing a space for lubricant therein and having opposite open end portions facing the pair of discs, a pair of widely spaced anti-friction bearings fitted in said open end portions of the housing close to the outer extremities thereof and lubricated by lubricant supplied to said space therefor, a head opposite one open end portion of the housing exteriorly thereof and having a spindle journalled in and projecting through said bearings and the opposite open end portion of the housing, lubricant seals in the opposite open end portions of the housing exteriorly of the bearings, means for securing a disc to said head and a disc to the free end of the spindle, and separate means for holding the bearings against endwise movement relative to each other and the housing.

3. In a mounting for spaced ground working discs of an agricultural implement, a housing disposed between a pair of such discs and connected with a beam of said implement, said housing having opposite open end portions facing the pair of discs and a pair of widely spaced internal annular shoulders formed in said open end portions of the housing close to the outer extremities thereof, a head opposite one open end portion of the housing exteriorly thereof and having a spindle projecting through the housing and the opposite open end portion thereof, a pair of widely spaced anti-friction bearings, rotatably mounting the spindle and its head and fitted in the opposite open end portions of the housing against said internal annular shoulders, means for securing a disc to said head and a disc to the free end of the spindle, and separate means for holding the bearings against endwise movement relative to each other and the housing.

4. In a mounting for spaced ground working discs of an agricultural implement, a housing disposed between a pair of such discs and connected with a beam of said implement; said housing having opposite open end portions facing the pair of discs and a pair of widely spaced internal annular shoulders formed in said open end portions of the housing close to the outer extremities thereof, a head opposite one open end portion of the housing exteriorly thereof and having a spindle projecting through the housing and the opposite open end portion thereof, a pair of widely spaced anti-friction bearings rotatably mounting the spindle and its head and having outer raceways fitted in the open end portions of the housing against said internal annular shoulders and inner raceways in said open end portions of the housing and fitted on the spindle, abutment means for said inner raceways including an annular shoulder engaging one inner raceway and formed on the spindle, means for securing a disc to said head and a disc to the free end of the spindle, and separate means for holding the bearings against endwise movement relative to each other and the housing.

5. In a mounting for spaced ground working discs of an agricultural implement, a housing disposed between a pair of such discs and connected with a beam of said implement, said housing having opposite open end portions facing the pair of discs, a shaft projecting through the housing beyond its opposite open end portions and through central openings of the pair of discs, a sleeve having a head at one end thereof, the sleeve and the head being fixed on the shaft, said head being disposed between one open end portion of the housing and one of the pair of discs and said sleeve projecting from the head through the housing and its opposite open end portion, a pair of widely spaced anti-friction bearings arranged in the open end portions of the housing close to the outer extremities thereof, said bearings having outer raceways fitted in said open end portions of the housing and inner raceways fitted upon the sleeve, abutment means in the opposite open end portions of the housing and engaged by said outer raceways, abutment means on the sleeve and engaged by said inner raceways, means on said shaft for clamping a disc to the free end of the sleeve and a disc to its head, and separate means for holding the bearings against endwise movement relative to each other and the housing.

DANNIE D. BIRT.

REFERENCES CITED

The following references are of record in the file of this patent:

UNITED STATES PATENTS

| Number | Name | Date |
| --- | --- | --- |
| 626,059 | Garst | May 30, 1899 |
| 1,823,422 | Bock | Sept. 15, 1931 |
| 2,314,469 | Walker | Mar. 23, 1943 |